United States Patent
Park et al.

(10) Patent No.: US 8,131,153 B2
(45) Date of Patent: Mar. 6, 2012

(54) POWER LINE COMMUNICATION SYSTEM USING HYBRID-FIBER COAXIAL AND COMMUNICATION DEVICE USED IN THE SYSTEM

(75) Inventors: Dong Young Park, Anyang-si (KR); Kwan Hee Han, Anyang-si (KR); Sung Wook Moon, Seoul (KR); Hyung Suk Choi, Anyang-si (KR); Wan Yoon Lee, Daegu (KR)

(73) Assignee: LS Cable Ltd., Seoul (KR)

( * ) Notice: Subject to any disclaimer, the term of this patent is extended or adjusted under 35 U.S.C. 154(b) by 952 days.

(21) Appl. No.: 12/095,171

(22) PCT Filed: Nov. 29, 2006

(86) PCT No.: PCT/KR2006/005101
§ 371 (c)(1),
(2), (4) Date: May 28, 2008

(87) PCT Pub. No.: WO2007/064149
PCT Pub. Date: Jun. 7, 2007

(65) Prior Publication Data
US 2008/0317472 A1     Dec. 25, 2008

(30) Foreign Application Priority Data

Nov. 29, 2005  (KR) .................. 10-2005-0115008
Dec. 7, 2005   (KR) .................. 10-2005-0119027
Nov. 29, 2006  (KR) .................. 10-2006-0118869

(51) Int. Cl.
*H04B 10/00* (2006.01)
(52) U.S. Cl. ..................... 398/115; 398/70; 398/74
(58) Field of Classification Search .......... 398/115–117, 398/58, 66–74
See application file for complete search history.

(56) References Cited

U.S. PATENT DOCUMENTS 6,526,581 B1   2/2003   Edson
6,570,913 B1   5/2003   Chen
(Continued)

FOREIGN PATENT DOCUMENTS
EP        1 367 774 A2    12/2003
(Continued)

OTHER PUBLICATIONS

European Patent Office, Extended European Search Report, Application No. EP 06 82 3809, issued Apr. 8, 2010.
(Continued)

*Primary Examiner* — Dzung Tran
(74) *Attorney, Agent, or Firm* — Jones Day

(57) ABSTRACT

A communication equipment which is utilized in a power line communication (PLC) system utilizing a hybrid fiber coax (HFC) which includes a PLC optical network unit, a PLC trunk bridge amplifier, a PLC distribution amplifier, and a PLC coupling device. In this instance, the PLC optical network unit does not require a PLC protocol conversion of an Ethernet signal by a cable modem and a PLC modem in each subscriber location, and enables a PLC communication between the each subscriber location and a communication terminal utilizing a PLC Ethernet signal as is, by receiving an optical signal from an optical transmitter via an optical fiber, converting the optical signal into the PLC Ethernet signal corresponding to a predetermined PLC protocol, and transmitting the PLC Ethernet signal to at least one subscriber location via a coaxial cable.

5 Claims, 8 Drawing Sheets

U.S. PATENT DOCUMENTS

| | | |
|---|---|---|
| 6,594,305 B1 | 7/2003 | Roeck et al. |
| 6,686,832 B2 | 2/2004 | Abraham |
| 6,904,134 B2 | 6/2005 | Jeon et al. |
| 7,478,416 B2 * | 1/2009 | Edson ............... 725/78 |
| 2003/0007503 A1 | 1/2003 | Daum et al. |
| 2004/0004538 A1 | 1/2004 | Manis |
| 2004/0103307 A1* | 5/2004 | Raphaeli et al. ......... 713/201 |
| 2004/0156373 A1 | 8/2004 | Ha et al. |
| 2004/0160905 A1 | 8/2004 | Bernier |
| 2006/0192672 A1* | 8/2006 | Gidge et al. ......... 340/538.11 |
| 2006/0209857 A1* | 9/2006 | Hicks, III ............. 370/401 |
| 2006/0221995 A1* | 10/2006 | Berkman ............. 370/463 |

FOREIGN PATENT DOCUMENTS

| | | |
|---|---|---|
| JP | 2003-069494 | 3/2003 |
| JP | 2005-295501 | 10/2005 |

OTHER PUBLICATIONS

Japanese Patent Office, Notice of Reasons for Rejection, Jul. 13, 2010.

* cited by examiner

POWER LINE COMMUNICATION SYSTEM USING HYBRID-FIBER COAXIAL AND COMMUNICATION DEVICE USED IN THE SYSTEM

TECHNICAL FIELD

The present invention relates to communication equipment which is utilized in a power line communication (PLC) system utilizing a hybrid fiber coax (HFC) which includes a PLC optical network unit, a PLC trunk bridge amplifier, a PLC distribution amplifier, and a PLC coupling device. More particularly, the present invention relates to communication equipment which is utilized in a PLC system utilizing an HFC in which a predetermined PLC converter replaces an uplink module of a distribution amplifier, an optical network unit, or a trunk bridge amplifier, and the PLC converter converts a predetermined optical signal or an Ethernet signal into a PLC Ethernet signal, transmits the converted PLC Ethernet signal to a subscriber location via a coaxial line, and a PLC coupling device installed in a subscriber location couples the PLC Ethernet signal with a power line to be transmitted to at least one communication terminal via the power line.

BACKGROUND ART

A power line communication (PLC) indicates a communication method which transmits/receives a data signal via a power line, wired in a house or an office to supply power. Specifically, the PLC may be embodied by modulating a data signal into a high frequency signal, transmitting the modulated high frequency signal to an alternating current (AC) line, and separating and receiving the transmitted high frequency signal via a high frequency filter. In this instance, the high frequency filter has a cutoff frequency of about 50 Hz or about 60 Hz.

Since a network utilizing PLC technology can be constructed utilizing an existing wiring, a cost burden, which may be caused by a construction with additional wiring, may be reduced. Also, an expansion that can install an additional device to a network with only a plug-in, even after constructing the network, is guaranteed. Thus, the PLC technology is widely utilized for any type of wired/wireless network solutions.

In addition to the PLC technology, a hybrid fiber coax (HFC) is widely utilized. The HFC includes an optical fiber and a coaxial cable, and can transmit a data signal (e.g., for Internet, cable television, crime prevention, disaster prevention, remote inspection, and automatic control) to a broadcasting station and an optical network unit via the optical fiber, and from the optical network unit to a subscriber via the coaxial cable. Theoretically, the HFC may support a wide transmission band that can connect each channel with a bandwidth of about 6 MHz at a transmission speed between 9600 bps and 42 Mbps.

FIG. 1 is a diagram illustrating a configuration of a network 110 including a PLC system installed in a subscriber location and a subscriber network utilizing an HFC according to a conventional art.

According to the PLC system and the subscriber network utilizing the HFC according to the conventional art, as shown in FIG. 1, a cable modem terminal system (CMTS) 111 receives a data signal from a video on demand (VOD) system, a Voice over Internet Protocol (VoIP) system or an Internet network, converts the data signal into a data packet signal, and transmits the converted data packet signal and a cable television (CATV) signal to an optical transmitter OTX 114. The CATV signal is transmitted from a CATV system 112. In this instance, the CMTS 111, the CATV system 112, and the optical transmitter 114 connect with one another via a coaxial cable 113. Specifically, the data packet signal may be transmitted to the optical transmitter 114 via the coaxial cable 113.

The optical transmitter 114 converts the received data packet signal into an optical signal and transmits the converted optical signal to an optical network unit ONU 120 via an optical fiber 121. The optical network unit 120 reconverts the optical signal into the data packet signal and transmits the reconverted data packet signal to a cable modem 141 of a subscriber location 140 via a trunk bridge amplifier TBA 130. In this case, a frequency band of a CATV signal may be separated from the data packet signal and transmitted to a television (TV) via a set-top box STB.

The cable modem 141 converts the data packet signal into a data signal and transmits the converted data signal to a PLC modem 142. The PLC modem 142 converts the data signal into a signal corresponding to a predetermined PLC protocol, couples the converted signal with a power line 143 to be transmitted to at least one communication terminal installed in the subscriber location 140.

Another PLC modem 144 is installed in each of the at least one communication terminal. The PLC modem 144 extracts the data signal from the PLC signal which is transmitted via the power line 143, and transmits the extracted data signal to each of the at least one communication terminal. In this instance, the communication terminal may include a home automation device, a personal computer (PC), a game device, a security system, and the like.

In a PLC system according to the conventional art, a home network utilizing an HFC may be constructed by utilizing only a previously installed power line, without installing additional wiring to a subscriber location. However, as described with FIG. 1, only when the cable modem 141 and the PLC modem 142 are separately installed in the subscriber location 140, a subscriber of a PLC service may utilize the PLC service utilizing the HFC. Also, only when protocol conversion according to a communication protocol between the power line 143 and the PLC modem 142 is performed in the subscriber location 140, the cable modem 141 and the PLC modem 142 may transmit/receive a signal with an external location.

Also, when the PLC system utilizing the HFC is constructed as described above, a data packet signal is required to be transmitted/received via the trunk bridge amplifier 130 and thus the data packet signal may be significantly attenuated.

Also, so that a communication terminal installed in a first subscriber location may communicate with another communication terminal installed in a second subscriber location, protocol conversion has to be performed via a PLC modem installed in each subscriber location. Also, the protocol converted signal has to pass through a CMTS.

Accordingly, the development of a PLC system utilizing an HFC which can outperform the conventional art, and utilize an existing HFC and a power line as is, and can perform more stable communications without performing a PLC protocol conversion and applying a PLC frame in each subscriber location, and prevent an attenuation in a signal caused by a trunk bridge amplifier, and can also readily interoperate with a PLC network in the each subscriber location is required.

DISCLOSURE OF INVENTION

Technical Goals

The present invention provides a PLC optical network unit which does not require a PLC protocol conversion of an Ethernet signal by a cable modem and a PLC modem in each subscriber location, and enables a PLC communication between the each subscriber location and a communication terminal utilizing a PLC Ethernet signal as is, by receiving an optical signal from an optical transmitter via an optical fiber, converting the optical signal into the PLC Ethernet signal corresponding to a predetermined PLC protocol, and transmitting the PLC Ethernet signal to at least one subscriber location via a coaxial cable.

The present invention also provides a PLC trunk bridge amplifier which does not require a PLC protocol conversion of an Ethernet signal by a cable modem and a PLC modem in each subscriber location, and enables a PLC communication between each subscriber location and a communication terminal utilizing a PLC Ethernet signal as is, by receiving an Ethernet signal from a predetermined optical network unit via a coaxial cable, converting the Ethernet signal into the PLC Ethernet signal corresponding to a predetermined PLC protocol, and transmitting the PLC Ethernet signal to at least one subscriber location via the coaxial cable.

The present invention also provides a PLC distribution amplifier which does not require a PLC protocol conversion of an Ethernet signal by a cable modem and a PLC modem in each subscriber location, and enables a PLC communication between each subscriber location and a communication terminal utilizing a PLC Ethernet signal as is, by receiving an Ethernet signal from a predetermined optical network unit or a trunk bridge amplifier via a coaxial cable, converting the Ethernet signal into the PLC Ethernet signal corresponding to a predetermined PLC protocol, and transmitting the PLC Ethernet signal to at least one subscriber location via the coaxial cable.

The present invention also provides a PLC coupling device which can embody a PLC system utilizing an existing coaxial cable and a power line, without a protocol conversion of an Ethernet signal and an additional power supply, by receiving a PLC Ethernet signal from the PLC optical network unit, the PLC trunk bridge amplifier, or the PLC distribution amplifier via a coaxial cable that connects with a subscriber location, coupling the PLC Ethernet signal with a power line, and transmitting the PLC Ethernet signal to at least one communication terminal installed in the subscriber location.

The present invention also provides a PLC system utilizing an HFC which can optimally prevent an attenuation of a downstream signal and a PLC Ethernet signal by detecting an amplification level or an attenuation level of the downstream signal and the PLC Ethernet signal of the PLC optical network unit, the PLC trunk bridge amplifier or the PLC distribution amplifier, and compensating for the detected amplification level or the attenuation level to be a predetermined value, and transmitting the compensated amplification level or the attenuation level.

The present invention also provides a PLC system utilizing an HFC which can more readily support an interoperation between a PLC network installed in a subscriber location and an external communication network without a PLC protocol conversion, by installing a PLC coupling device that performs only a medium conversion between a coaxial cable and a power line with respect to a PLC Ethernet signal in the subscriber location.

Technical Solutions

According to an aspect of the present invention, there is provided a power line communication (PLC) optical network unit including: a first communication port unit connecting with a predetermined optical fiber, and receiving a predetermined optical Ethernet signal from a predetermined optical Ethernet device via the optical fiber; a second communication port unit connecting with at least one coaxial cable; a medium converter converting the received optical Ethernet signal into an Ethernet signal; a PLC converter converting the Ethernet signal into a PLC Ethernet signal corresponding to a predetermined PLC protocol; and a transmission control unit controlling the PLC Ethernet signal to be transmitted to a subscriber location via the at least one coaxial cable that connects with the second communication port unit.

According to another aspect of the present invention, there is provided a PLC trunk bridge amplifier including: a first communication port unit connecting with a predetermined optical network unit or an optical Ethernet device via an optical fiber, and receiving a predetermined optical Ethernet signal from the optical network unit or the optical Ethernet device; a second communication port unit connecting with at least one coaxial cable; a medium converter converting the received optical Ethernet signal into an Ethernet signal; a PLC converter converting the Ethernet signal into a PLC Ethernet signal corresponding to a predetermined PLC protocol; and a transmission control unit controlling the PLC Ethernet signal to be transmitted to a subscriber location via the at least one coaxial cable that connects with the second communication port unit.

According to still another aspect of the present invention, there is provided a trunk bridge amplifier including: a first communication port unit connecting with a predetermined optical network unit via a coaxial cable and splitting a PLC Ethernet signal, which is transmitted from the optical network unit, into a high band PLC Ethernet signal and a low band PLC Ethernet signal; a second communication port unit connecting with a subscriber location via at least one coaxial cable and splitting a PLC Ethernet signal, which is transmitted from the subscriber location, into a high band PLC Ethernet signal and a low band PLC Ethernet signal; an amplification unit amplifying the high band PLC Ethernet signal, which is split via the first communication port unit, and transmitting the amplified high band PLC Ethernet signal to the subscriber location via the second communication port unit; and a low pass filter unit controlling the low band PLC Ethernet signal, which is split via the first communication port unit or the second communication port unit, to be transmitted to the optical network unit or to the subscriber location.

According to yet another aspect of the present invention, there is provided a PLC distribution amplifier including: a first communication port unit connecting with a predetermined optical network unit, a trunk bridge amplifier, or an optical Ethernet device via an optical fiber, and receiving a predetermined optical Ethernet signal from the optical network unit, the trunk bridge amplifier, or the optical Ethernet device; a second communication port unit connecting with at least one coaxial cable; a medium converter converting the received optical Ethernet signal into an Ethernet signal; a PLC converter converting the Ethernet signal into a PLC Ethernet signal corresponding to a predetermined PLC protocol; and a transmission control unit controlling the PLC Ethernet signal to be transmitted to a subscriber location via the at least one coaxial cable that connects with the second communication port unit.

According to a further aspect of the present invention, there is provided a distribution amplifier including: a first communication port unit connecting with a predetermined optical network unit or a trunk bridge amplifier via a coaxial cable and splitting a PLC Ethernet signal, which is transmitted from the optical network unit or the trunk bridge amplifier, into a high band PLC Ethernet signal and a low band PLC Ethernet signal; a second communication port unit connecting with a subscriber location via at least one coaxial cable and splitting a PLC Ethernet signal, which is transmitted from the subscriber location, into a high band PLC Ethernet signal and a low band PLC Ethernet signal; an amplification unit amplifying the high band PLC Ethernet signal, which is split via the first communication port unit, and transmitting the amplified high band PLC Ethernet signal to the subscriber location via the second communication port unit; and a low pass filter unit controlling the low band PLC Ethernet signal, which is split via the first communication port unit or the second communication port unit, to be transmitted to the optical network unit or to the subscriber location.

According to still another aspect of the present invention, there is provided a PLC coupling device including: a coaxial cable port unit connecting with a predetermined coaxial cable and receiving a predetermined PLC Ethernet signal via the coaxial cable; a power line port unit connecting with at least one communication terminal, which is installed in the subscriber location, via a power line; and a coupling control unit transmitting the PLC Ethernet signal to the at least one communication terminal by coupling the PLC Ethernet signal with the power line.

According to still another aspect of the present invention, there is provided an HFC PLC system including: an optical Ethernet device converting an Ethernet signal, which is received from a predetermined IP network, into an optical Ethernet signal; an optical transmitter converting a CATV signal, which is received from a predetermined CATV system, into a CATV optical signal; an optical network unit converting the CATV optical signal, which is received from the optical transmitter via an optical fiber, into a CATV signal and converting the optical Ethernet signal, which is received from the optical Ethernet device, into a PLC Ethernet signal corresponding to a predetermined PLC protocol; and a PLC coupling device receiving the CATV signal or the PLC Ethernet signal from the optical network unit, and controlling the CATV signal to be transmitted to at least one display terminal which is installed in a subscriber location and controlling the PLC Ethernet signal to be transmitted to at least one communication terminal, which is installed in a subscriber location, via a power line.

According to still another aspect of the present invention, there is provided an HFC PLC system including: an optical Ethernet device converting an Ethernet signal, which is received from a predetermined IP network, into an optical Ethernet signal; a trunk bridge amplifier converting the optical Ethernet signal, which is received from the optical Ethernet device, a predetermined optical network unit or a predetermined optical network unit, into a PLC Ethernet signal corresponding to a predetermined PLC protocol; and a PLC coupling device receiving the PLC Ethernet signal from the trunk bridge amplifier, and controlling the PLC Ethernet signal to be transmitted to at least one communication terminal, which is installed in the subscriber location, via a power line.

According to still another aspect of the present invention, there is provided an HFC PLC system including: an optical Ethernet device converting an Ethernet signal, which is received from a predetermined IP network, into an optical Ethernet signal; a distribution amplifier converting the optical Ethernet signal, which is received from the optical Ethernet device, a predetermined optical network unit, or a predetermined trunk bridge amplifier, into a PLC Ethernet signal corresponding to a predetermined PLC protocol; and a PLC coupling device receiving the PLC Ethernet signal from the distribution amplifier, and controlling the PLC Ethernet signal to be transmitted to at least one communication terminal, which is installed in the subscriber location, via a power line.

BEST MODE FOR CARRYING OUT THE INVENTION

Figure 1:
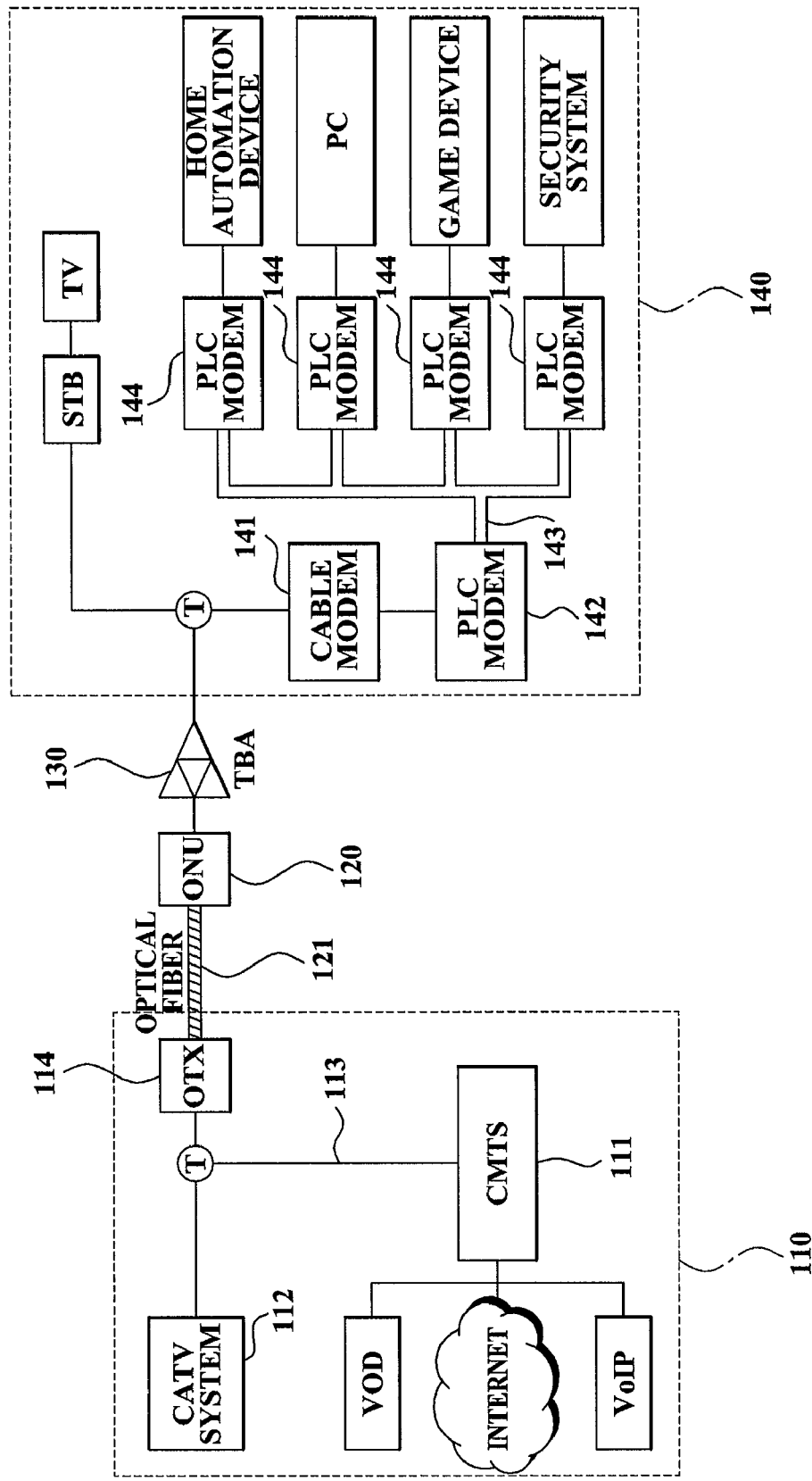
FIG. 1 is a diagram illustrating a configuration of a network including a PLC system installed in a subscriber location and a subscriber network utilizing an HFC according to a conventional art.

Reference will now be made in detail to embodiments of the present invention, examples of which are illustrated in the accompanying drawings, wherein like reference numerals refer to the like elements throughout. The embodiments are described below in order to explain the present invention by referring to the figures.

A power line communication (PLC) system using a hybrid fiber coax (HFC) according to the present invention may include a PLC optical network unit, a trunk bridge amplifier, a distribution amplifier, and a PLC coupling device. Also, the PLC system using the HFC according to the present invention may include an optical network unit, a PLC trunk bridge amplifier, a distribution amplifier, and a PLC coupling device. Also, the PLC system using the HFC according to the present invention may include an optical network unit, a trunk bridge amplifier, a PLC distribution amplifier, and a PLC coupling device.

Specifically, any one of an optical network unit, a trunk bridge amplifier, and a distribution amplifier may perform an operation of converting an Ethernet signal into a PLC Ethernet signal corresponding to a predetermined PLC protocol. In the present specification, when the optical network unit converts the Ethernet signal into the PLC Ethernet signal, the optical network unit is referred to as a PLC optical network unit. When the trunk bridge amplifier converts the Ethernet signal into the PLC Ethernet signal, the trunk bridge amplifier is referred to as a PLD trunk bridge amplifier. Also, when the distribution amplifier converts the Ethernet signal into the PLC Ethernet signal, the distribution amplifier is referred to as a PLC distribution amplifier.

Hereinafter, when the optical network unit corresponds to an entity of performing an operation of converting the Ethernet signal into the PLC Ethernet signal, i.e. when the PLC system using the HFC includes the PLC optical network unit will be described and then other configuration components will be described.

Figure 2:
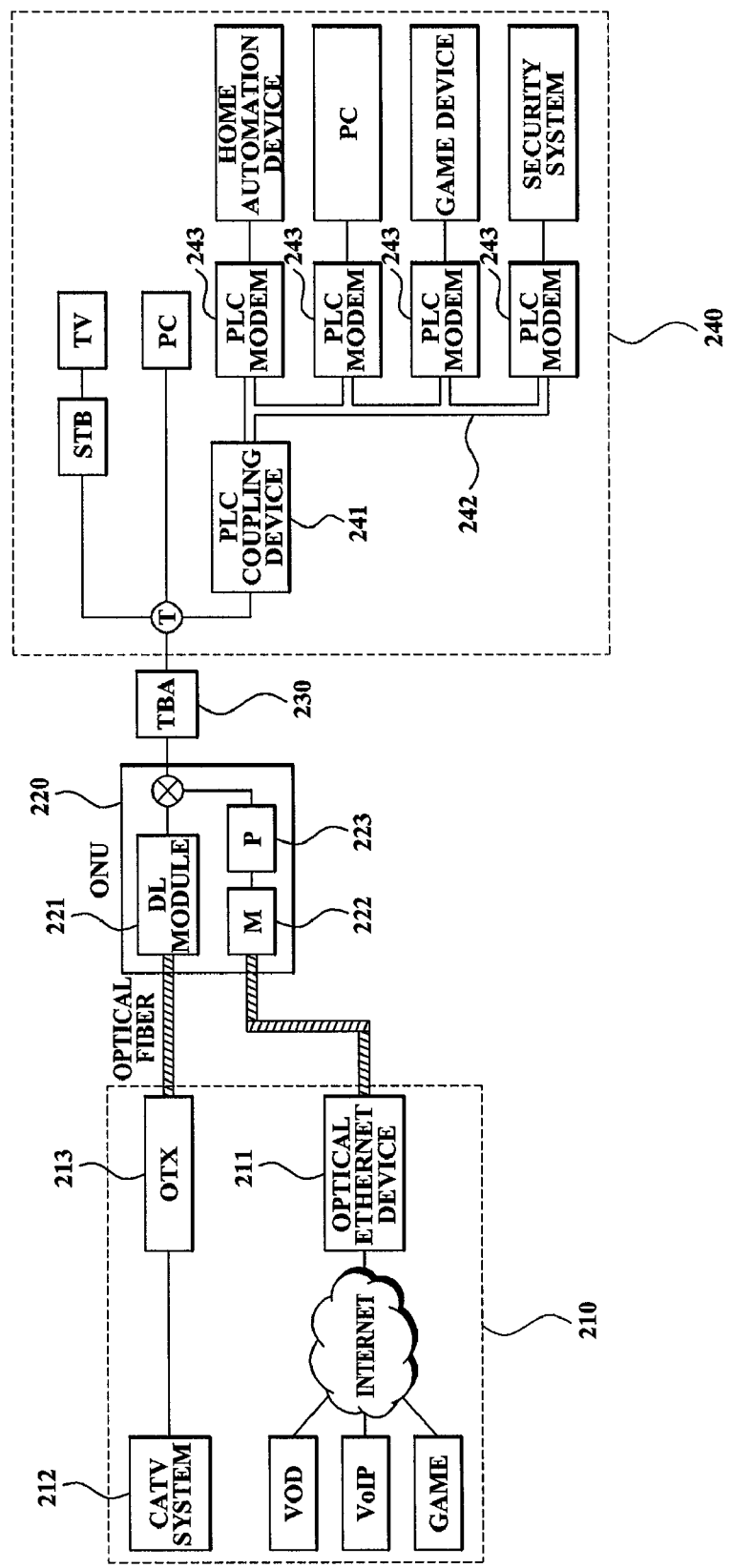
FIG. 2 is a diagram illustrating a network configuration of a PLC system utilizing an HFC according to an embodiment of the present invention.

FIG. 2 is a diagram illustrating a network configuration of a PLC system utilizing an HFC according to an embodiment of the present invention.

The PLC system according to the present embodiment includes an optical Ethernet device 211, a cable television (CATV) system 212, and an optical transmitter OTX 213 which are installed in a service supply end 210, and a PLC coupling device 241, a power line 242, and a PLC modem 243 which are installed in a subscriber location 240. Also, a PLC optical network unit ONU 220 and a trunk bridge amplifier TBA 230 may be provided between the service supply end 210 and the subscriber location 240.

The optical Ethernet device 211 connects with a predetermined Internet Protocol (IP) network. The optical Ethernet device 211 converts a voice on demand (VOD) signal, a Voice over Internet Protocol (VoIP) signal, and the like, which are received via the IP network, into an optical Ethernet signal. Also, the optical Ethernet device 211 transmits the converted optical Ethernet signal to the PLC optical network unit 220 via an optical fiber.

The optical transmitter 213 receives a CATV signal from the CATV system 212, and converts the received CATV signal into a CATV optical signal. Also, the optical transmitter 213 transmits the CATV optical signal to the PLC optical network unit 220 via another optical fiber.

The PLC optical network unit 220 receives the CATV optical signal from the optical transmitter 213 via a downlink module 221. Also, the PLC optical network unit 220 receives the optical Ethernet signal from the optical Ethernet device 221 via a medium converter 222 of the PLC optical network unit 220. Specifically, the PLC optical network unit 220 may connect with the optical transmitter 213 via the downlink module 221 and the optical fiber. Also, the PLC optical network unit 220 may connect with the optical Ethernet device 211 via the medium converter 222 and another optical fiber.

Also, when a Wavelength Division Multiplexing (WDM) scheme is used, the optical fiber connecting with the optical transmitter 213 and the other optical fiber connecting with the optical Ethernet device 211 may be combined into a single optical fiber. The single combined optical fiber may connect with the PLC optical network unit 220. In this case, the CATV optical signal and the optical Ethernet signal, which are transmitted to the PLC optical network unit 220, may be split via a predetermined distributor and then transmitted to the downlink module 221 and the medium converter 222 respectively.

The PLC optical network unit 220 receives the optical Ethernet signal from the optical Ethernet device 211 via the optical fiber, and converts the received optical Ethernet signal into an Ethernet signal. Also, the PLC optical network unit 220 converts the Ethernet signal into a PLC Ethernet signal corresponding to a predetermined PLC protocol. Also, the PLC optical network unit 220 transmits the PLC Ethernet signal to the trunk bridge amplifier 230.

Also, the PLC optical network unit 220 receives a CATV signal from the optical transmitter 213, and converts the received CATV optical signal into a CATV signal via the downlink module 221. The PLC optical network unit 220 transmits the CATV signal to the trunk bridge amplifier 230. A configuration and operation of the PLC optical network unit 220 will be described in detail with reference to FIG. 3.

The trunk bridge amplifier TBA 230 amplifies the PLC Ethernet signal or the CATV signal and transmits the amplified PLC Ethernet signal or the CATV signal to the subscriber location 240.

In this instance, the CATV signal transmitted to the subscriber location 240 may be transmitted to a television (TV) via a set-top box (STB) or may be transmitted to a personal computer (PC), and the like. Also, the PLC Ethernet signal may be transmitted to the PLC coupling device 241.

The PLC coupling device 241 receives the PLC Ethernet signal from the trunk bridge amplifier 230 via the coaxial cable. The PLC coupling device 241 couples the received PLC Ethernet signal with the power line 242 and transmits the PLC Ethernet signal to each PLC modem 243, which will be described with reference to FIG. 7.

The PLC Ethernet signal coupled with the power line 242 by the PLC coupling device 241 is transmitted to each PLC modem 243 that connects with at least one communication terminal positioned in the subscriber location 240. The PLC modem 243 extracts a PLC Ethernet signal from the coupled PLC Ethernet signal and the power signal transmitted from the power line 242, converts the extracted PLC Ethernet signal into a predetermined protocol, and transmits the converted PLC Ethernet signal to each communication terminal. The PLC modem 243 may be utilized in a general PLC system. Also, the communication terminal may include a home automation device, a PC, a TV, a game device, a security system, and the like.

As described above, in a PLC system utilizing an HFC according to an embodiment of the present invention, an additional cable modem performing a PLC protocol conversion is not required in a subscriber location. Therefore, the PLC system of the subscriber location may be even more easily constructed.

Specifically, in the PLC system according to the present embodiment, the PLC optical network unit 220 converts an Ethernet signal into a suitable PLC Ethernet signal for a PLC service, and transmits the converted PLC Ethernet signal to the subscriber location 240. Therefore, the subscriber location 240 may utilize the PLC service by only installing a PLC modem in the communication terminal without converting the Ethernet signal into a PLC protocol. As described above, the conversion operation may be performed by the optical network unit 220, the trunk bridge amplifier 230, or a distribution amplifier (not shown).

When constructing a PLC system utilizing an HFC according to the present invention, communication terminals of subscribers may be connected to each other. Also, the PLC system may be constructed to readily interoperate with a previously installed PLC network without additional equipment.

As described above, a PLC system according to an embodiment of the present invention may include a PLC optical network unit. Also, a PLC system according to another embodiment of the present invention may include a PLC trunk bridge amplifier and a PLC distribution amplifier. Hereinafter, a configurations and operation of a PLC optical network unit, a PLC trunk bridge amplifier, a PLC distribution amplifier, and a PLC coupling device will be described with reference to FIGS. 3 through 6.

Figure 3:
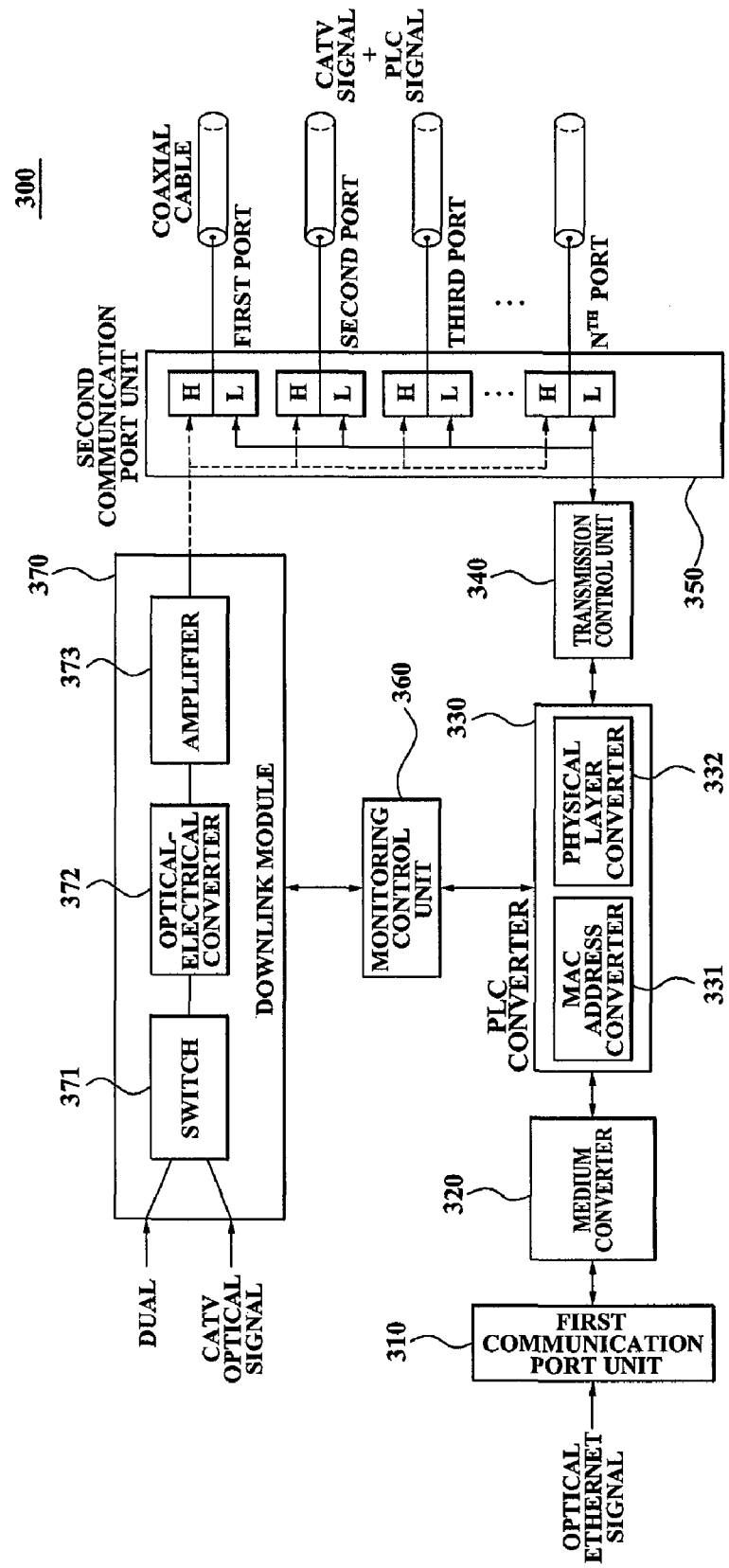
FIG. 3 is a block diagram illustrating a configuration of a PLC optical network unit according to an embodiment of the present invention.

FIG. 3 is a block diagram illustrating a configuration of a PLC optical network unit 300 according to an embodiment of the present invention.

The PLC optical network unit 300 according to the present embodiment includes a first communication port unit 310, a medium converter 320, a PLC converter 330, a transmission control unit 340, a second communication port unit 350, and a monitoring control unit 360. Also, the PLC optical network unit may further include a downlink module 370.

The medium converter 320, the PLC converter 330, the transmission control unit 340, and the monitoring control unit 360, as shown in FIG. 3, may replace an uplink module of an existing optical network unit. Specifically, the existing optical network unit generally includes a downlink module and the uplink module. The PLC optical network unit 300 according to the present embodiment may replace the uplink module with the medium converter 320, the PLC converter 330, the transmission control unit 340, and the monitoring control unit 360.

An Ethernet signal that is generally utilized in the HFC may be divided into an uplink band signal and a downlink band signal. The uplink band signal is in a frequency band between 5 MHz and 42 MHz. Also, the downlink band signal is in a frequency band between 54 MHz and 870 MHz.

As shown in FIG. 3, the PLC optical network unit 300 according to the present embodiment may include the second communication port unit 350. The second communication port unit 350 includes at least one port which includes a high pass filter and a low pass filter. Although not shown in FIG. 3, the first communication port unit 310 may also include at least one port which includes a high pass filter and a low pass filter.

In this case, a signal that is introduced into each port may be divided into a low pass signal and a high pass signal. The low pass signal and the high pass signal may be transmitted to the uplink module and the downlink module respectively. Specifically, the low pass signal with a frequency band between 5 MHz and 42 MHz may be transmitted to the uplink module. Also, the high pass signal with a frequency band between 54 MHz and 870 MHz may be transmitted to the downlink module.

Generally, a large amount of signal loss may occur in the high frequency band between 54 MHz and 870 MHz during a process of transmission. Therefore, the low pass signal with the frequency band between 5 MHz and 42 MHz may be utilized. Accordingly, the PLC optical network unit 300 according to the present embodiment may replace a configuration of the uplink module, utilizing the low pass signal, with a configuration of the medium converter 320, the PLC converter 330, the transmission control unit 340, and the monitoring control unit 360.

When the PLC optical network unit 300 is constructed as described above, the frequency band between 5 MHz and 42 MHz may be utilized for a bi-directional transmission. Specifically, by replacing the existing uplink module, which includes a unidirectional amplifier, with the medium converter 320, the PLC converter 330, the transmission control unit 340, and the monitoring control unit 360, the low pass signal with the frequency band between 5 MHz and 42 MHz in the uplink module may be bi-directionally transmitted.

Also, the CATV optical signal transmitted from the optical transmitter 213 may be introduced into the downlink module 370, and the optical Ethernet signal transmitted from the optical Ethernet device 211 may be introduced into the first communication port unit 310. Specifically, by splitting and receiving the CATV signal and the optical Ethernet signal, only the optical Ethernet signal, which is used for a PLC in the subscriber location, may be converted into the PLC Ethernet signal, and transmitted to the subscriber location.

Therefore, the CATV optical signal may be converted into a CATV signal via the downlink module 370 and transmitted to the subscriber location. Also, in the case of a subscriber location that does not utilize a PLC, even the optical Ethernet signal is not converted into the PLC Ethernet signal, i.e. the CATV optical signal may be converted into an Ethernet signal via the downlink module 370 and transmitted to the subscriber location.

The configuration and operation of the PLC optical network unit 300 may be similar to a configuration and operation of a PLC trunk bridge amplifier and a PLC distribution amplifier.

The first communication port unit 310 receives an optical Ethernet signal from an optical transmitter connected via an optical fiber. The first communication port unit 310 may include various types of ports corresponding to a predetermined optical signal transmission protocol for a connection with the optical fiber and a receipt of the optical Ethernet signal.

The medium converter 320 receives the optical Ethernet signal from the first communication port 310 and converts the optical Ethernet signal into an Ethernet signal. Specifically, the medium converter 320 performs an optical-electrical conversion with respect to the optical Ethernet signal that is received via the optical fiber.

The PLC converter 330 converts the Ethernet signal, which is converted via the medium converter 320, into a PLC Ethernet signal corresponding to a predetermined PLC protocol. The PLC converter 330 may include a Media Access Control (MAC) address converter 331 and a physical layer converter 332.

The MAC address converter 331 converts a MAC address of the Ethernet signal into a MAC address corresponding to the PLC protocol. In this instance, the PLC protocol may include any type of protocol utilized as a PLC protocol in the related arts. Therefore, the MAC address converter 331 may convert the Ethernet signal into an Ethernet signal which includes various types of MAC addresses corresponding to each PLC protocol.

The physical layer converter 332 modulates the Ethernet signal into a PLC Ethernet signal which includes a physical layer corresponding to the PLC protocol. In this instance, the Ethernet signal includes the converted MAC address. Specifically, the physical layer converter 332 may couple, and modulate or demodulate a channel of the Ethernet signal, which includes the converted MAC address, according to the PLC protocol. As described above, the physical layer converter 332 may convert the Ethernet signal into the PLC Ethernet signal corresponding to the PLC protocol, by performing channel coupling, and modulation or demodulation.

The PLC converter 330 converts the Ethernet signal into the PLC Ethernet signal which is in the frequency band between 5 MHz and the 42 MHz. Specifically, the PLC optical network unit 300 according to the present embodiment may readily replace the uplink module with the medium converter 320, the PLC converter 330, the transmission control unit 340, and the monitoring control unit 360 by converting the Ethernet signal into the PLC Ethernet signal which is in the frequency band between 5 MHz and 42 MHz. In this instance, the frequency band is similar to an upstream signal frequency band of the uplink module in the existing optical network unit.

The transmission control unit 340 transmits the PLC Ethernet signal to a trunk bridge amplifier via at least one coaxial cable. In this instance, the at least one coaxial cable connects with the second communication port unit 350. Also, the transmission control unit 340 may couple the PLC Ethernet signal, as an analog signal, with the coaxial cable and transmit the coupled PLC Ethernet signal. In this case, as shown in FIG. 4, the transmission control unit 340 may include a predetermined coupling filter 410 and a coupler 420.

Figure 4:
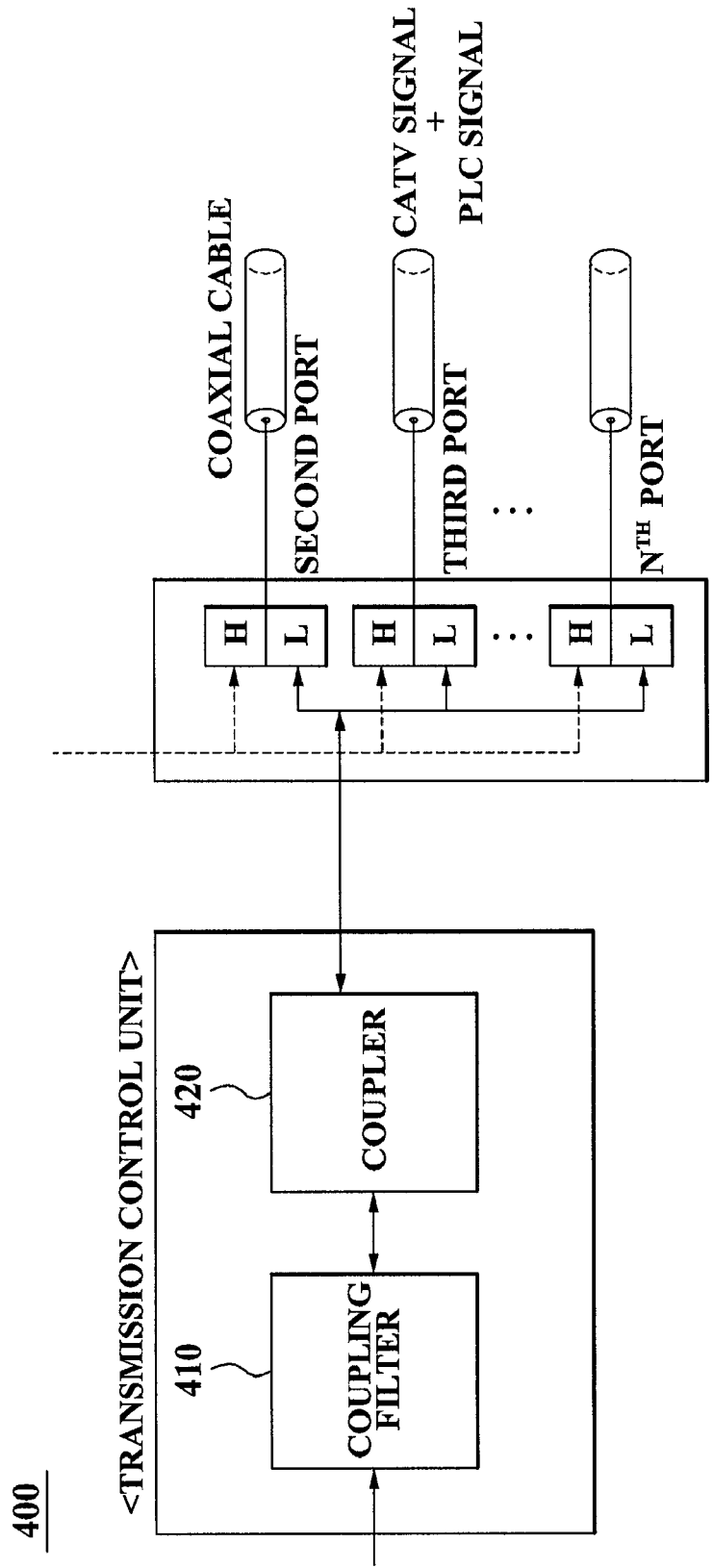
FIG. 4 is a block diagram illustrating a configuration of a transmission control unit of a PLC optical network unit according to an embodiment of the present invention.

Also, as shown in FIG. 4, the transmission control unit 340 may divide the PLC Ethernet signal into a plurality of PLC Ethernet signals via a coupler 420 and transmit each of the plurality of PLC Ethernet signals to each port of a second communication port unit 430. Conversely, the coupler 420 may couple a plurality of PLC Ethernet signals, which are transmitted from each port of the second communication port unit 430, into a single PLC Ethernet signal.

Referring again to FIG. 3, the second communication port unit 350 connects with at least one coaxial cable. The second communication port unit 350 may include at least one coaxial cable terminal to connect with the at least one coaxial cable. In this instance, the at least one coaxial cable connects with at least one subscriber location respectively via a trunk bridge amplifier. In this case, the transmission control unit 340 may couple each PLC Ethernet signal outputted from the PLC converter 330 and transmit the coupled PLC Ethernet signal to the trunk bridge amplifier via each coaxial cable terminal which is included in the second communication port unit 350.

Also, the trunk bridge amplifier may amplify the PLC Ethernet signal and transmit the amplified PLC Ethernet signal to a PLC coupling device installed in a predetermined subscriber location. The PLC coupling device may couple the PLC Ethernet signal with a power line and transmit the coupled PLC Ethernet signal, via the power line, to at least one communication terminal installed in the subscriber location.

The downlink module 370 receives a CATV optical signal via the first communication port unit 310 and converts the received CATV optical signal into a CATV signal. Also, the downlink module 370 amplifies and equalizes the CATV signal, and thus, transmits the amplified and equalized CATV signal to the trunk bridge amplifier via the second communication port unit 350. In this instance, the downlink module 370 may include a switch 371, an optical-electrical converter 372, and an amplifier 373.

The switch 371 may connect with at least one optical fiber. Also, the switch 371 selects any one of at least one CATV optical signal, which is received via the at least one optical fiber, and transmits the selected CATV optical signal to the optical-electrical converter 372. In this instance, the CATV optical signal may be variously selected depending upon an operator.

The optical-electrical converter 372 converts the CATV optical signal into a CATV signal. Specifically, the optical-electrical converter 372 performs optical-electrical conversion with respect to the CATV optical signal and thereby converts the CATV optical signal into the CATV signal.

The amplifier 373 amplifies the CATV signal and transmits the amplified CATV signal to the trunk bridge amplifier via the second communication port unit 350. Also, the downlink module 370 may further include a predetermined equalizer to equalize the CATV signal.

The monitoring control unit 360 detects an amplification level or an attenuation level of the CATV signal of the downlink module 370 and controls the downlink module 370 to amplify the CATV signal. Also, the monitoring control unit 360 may control the amplification level or the attenuation level of the PLC Ethernet signal which is converted via the PLC converter 330. As described above, the PLC optical network unit 300 according to the present embodiment may prevent an attenuation of a downstream signal and a PLC Ethernet signal by detecting an attenuation level of the downstream signal and the PLC Ethernet signal, compensating for the detected amplification level or the attenuation level to be a predetermined value, and transmitting/receiving the compensated amplification level or the attenuation level.

Also, the transmission control unit 340 may couple the PLC Ethernet signal and the CATV signal into a single signal, and transmit the coupled single signal to the trunk bridge amplifier via the coaxial cable that connects with each port of the second communication port unit 350.

Also, the transmission control unit 340 receives at least one PLC Ethernet signal via the second communication port unit 350, and couples the at least one PLC Ethernet signal into a single PLC Ethernet signal. The PLC converter 330 converts the PLC Ethernet signal into an electrical Ethernet signal. The medium converter 320 converts the electrical Ethernet signal into an optical signal and transmits the optical signal to the optical transmitter via the optical fiber. Specifically, the PLC optical network unit 300 according to the present embodiment may support bi-directional communications.

As described with FIGS. 2 through 4, a PLC system according to an embodiment of the present invention may include a PLC optical network unit, and a trunk bridge amplifier. Also, although not shown in FIG. 2, the PLC system may further include a distribution amplifier. Specifically, the PLC optical network unit may perform an operation of converting an Ethernet signal into a PLC Ethernet signal.

According to another embodiment of the present invention, a trunk bridge amplifier or a distribution amplifier may perform an operation of converting an Ethernet signal into a PLC Ethernet signal. In this instance, when the trunk bridge amplifier performs the operation, a PLC system according to the present embodiment may include an optical network unit, a PLC trunk bridge amplifier, and the distribution amplifier. Also, when the distribution amplifier performs the operation, the PLC system may include the optical network unit, the trunk bridge amplifier, and a PLC distribution amplifier.

The PLC system according to each of the above-described embodiments may have a different entity performing a PLC conversion, but have a similar configuration as shown in FIG. 2. Hereinafter, a configuration and operation of the PLC trunk bridge amplifier and the PLC distribution amplifier will be described with reference to FIGS. 5 and 6.

Figure 5:
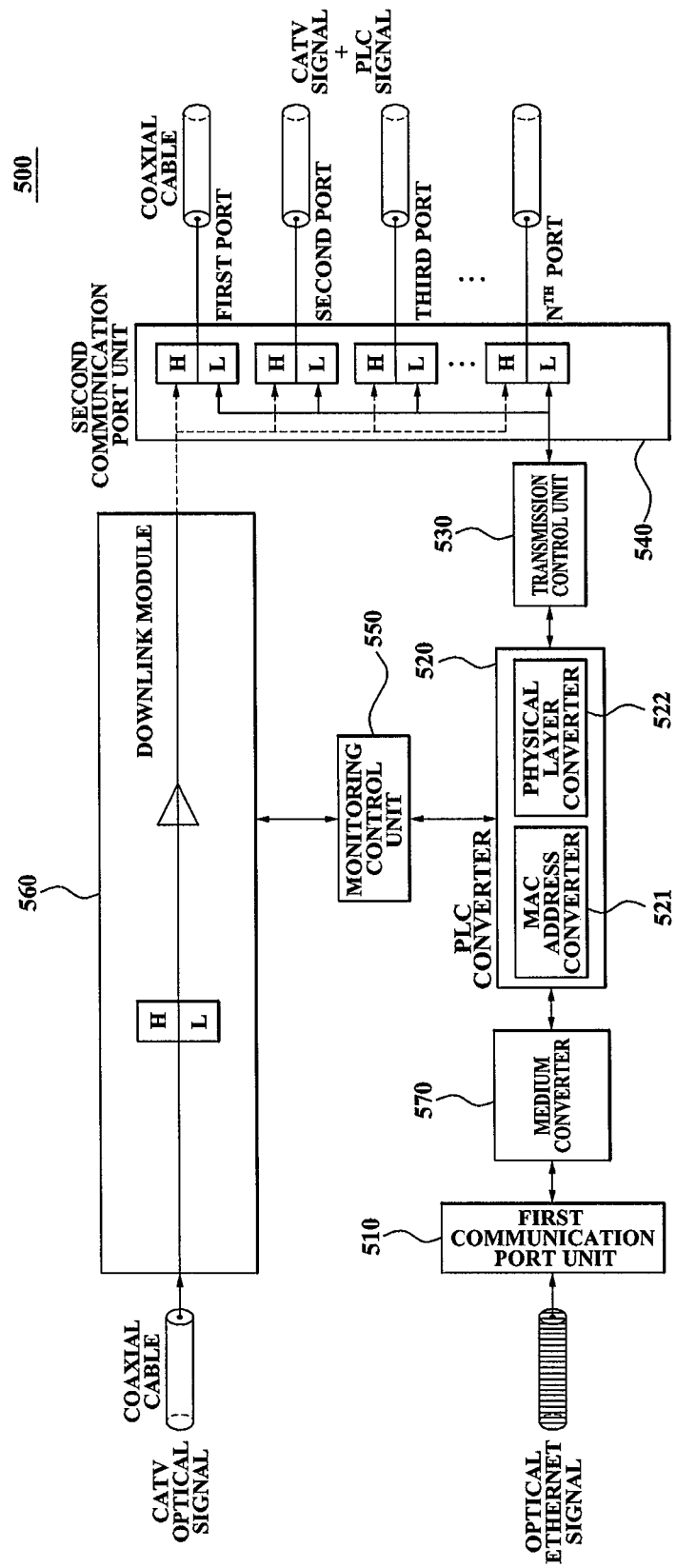
FIG. 5 is a block diagram illustrating a configuration of a PLC trunk bridge amplifier according to an embodiment of the present invention.

FIG. 5 is a block diagram illustrating a configuration of a PLC trunk bridge amplifier 500 according to an embodiment of the present invention.

The PLC trunk bridge amplifier 500 according to the present embodiment includes a first communication port unit 510, a PLC converter 520, a transmission control unit 530, a second communication port unit 540, a monitoring control unit 550, and a medium converter 570. The PLC trunk bridge amplifier 500 may further include a downlink module 560. The PLC converter 520 includes a MAC address converter 521 and a physical layer converter 522.

The PLC converter 520, the transmission control unit 530, the monitoring control unit 550, and the medium converter 570, as shown in FIG. 5, may replace an uplink module of an existing trunk bridge amplifier. Specifically, the existing trunk bridge amplifier generally includes a downlink module and the uplink module. The PLC trunk bridge amplifier 500 according to the present embodiment may replace the uplink module with the PLC converter 520, the transmission control unit 530, the monitoring control unit 550 and the medium converter 570. In this instance, the configuration and operation may be the same as the configuration of the optical network unit 300 as described above.

The first communication port unit 510 connects with an optical network unit via a coaxial cable and receives an optical Ethernet signal from the optical network unit. Also, the first communication port unit 510 may directly connect with an optical Ethernet device via the optical fiber, and directly receive the optical Ethernet signal from the optical Ethernet device, not using the optical network unit.

The medium converter 570 receives the optical Ethernet signal via the first communication port unit 510, and converts the optical Ethernet signal into an Ethernet signal. Specifically, the medium converter 570 may perform an optical-electrical conversion with respect to the optical Ethernet signal and thereby convert the optical Ethernet signal into the Ethernet signal.

The PLC converter 520 converts the Ethernet signal into a PLC Ethernet signal corresponding to a predetermined PLC protocol. The PLC converter 520 may include the MAC address converter 521 and the physical layer converter 522. A configuration and an operation of the PLC converter 520 may be the same as the configuration and operation of the PLC converter 330 which is included in the PLC optical network unit 300 of FIG. 3. Therefore, detailed description related thereto will be omitted.

In this instance, the PLC converter 520 converts the Ethernet signal into a PLC Ethernet signal which is in a frequency band between 5 MHz and 42 MHz. Specifically, the PLC trunk bridge amplifier 500 according to the present embodiment may readily replace the uplink module with the PLC converter 520, the transmission control unit 530, and the monitoring control unit 550, by converting the Ethernet signal into the PLC Ethernet signal with the frequency band between 5 MHz and 42 MHz. In this instance, the frequency band is similar to an upstream signal frequency band of the uplink module in the existing trunk bridge amplifier.

The transmission control unit 530 transmits the PLC Ethernet signal to a PLC coupling device installed in a predetermined subscriber location via at least one coaxial cable. In this instance, the at least one coaxial cable connects with the second communication port unit 540. Also, the transmission control unit 530 may couple the PLC Ethernet signal, as an analog signal, with the coaxial cable, and transmit the coupled PLC Ethernet signal. In this case, the transmission control unit 530 may include the coupling filter 410 and the coupler 420 as shown in FIG. 4. Specifically, the transmission control unit 530 may be embodied in the same way as the configuration and operation of the transmission control unit 340 which is included in the PLC optical network unit 300 according to an embodiment of the present invention.

The second communication port unit 540 connects with at least one coaxial cable. The second communication port unit 540 may include at least one coaxial cable terminal to connect with the at least one coaxial cable. In this instance, the at least one coaxial cable connects with the PLC coupling device installed in a predetermined subscriber location. In this case, the transmission control unit 530 may couple the PLC Ethernet signal outputted from the PLC converter 520 and transmit the coupled PLC Ethernet signal to the PLC coupling device via each coaxial cable terminal which is included in the second communication port unit 540.

Also, the PLC coupling device may couple the PLC Ethernet signal with a power line, and transmit the coupled PLC Ethernet signal to at least one communication terminal installed in the subscriber location via the power line.

The downlink module 560 may connect with an optical network unit via a coaxial cable. Also, the downlink module 560 receives a CATV signal from the optical network unit via the coaxial cable. Also, the downlink module 560 may filter or amplify the CATV signal at a predetermined band, and transmit the filtered or amplified CATV signal to a subscriber location. In this instance, the downlink module 560 may include a high pass filter, a low pass filter, an amplifier, and the like.

The monitoring control unit 550 detects an amplification level or an attenuation level of the CATV signal of the downlink module 560 and controls the downlink module 560 to amplify the CATV signal. Also, the monitoring control unit 550 may control the amplification level or the attenuation level of the PLC Ethernet signal which is converted via the PLC converter 520. As described above, the PLC trunk bridge amplifier 500 according to the present embodiment may prevent an attenuation of a downstream signal and a PLC Ethernet signal by detecting an attenuation level of the downstream signal and the PLC Ethernet signal, compensating for the detected amplification level or the attenuation level to be a predetermined value, and transmitting/receiving the compensated amplification level or the attenuation level.

According to another embodiment of the present invention, when an optical network unit performs a PLC signal conversion, a trunk bridge amplifier may be constructed to perform only an amplification of a downlink high pass signal or perform only a bypass operation of a downlink low pass signal, without performing the PLC signal conversion as the above-described PLC trunk bridge amplifier 500.

Figure 9:
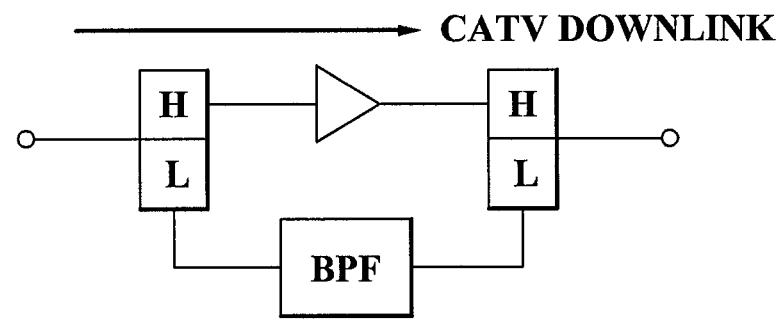
FIG. 9 is a block diagram illustrating a configuration of a trunk bridge amplifier according to another embodiment of the present invention.

In this case, an uplink module of the trunk bridge amplifier may include a first communication port unit, a second communication port unit, an amplification unit and a low pass filter unit. A configuration of the trunk bridge amplifier according to the present embodiment is shown in FIG. 9.

The first communication port unit connects with a predetermined optical network unit via a coaxial cable, and splits a PLC Ethernet signal, which is transmitted from the optical network unit, into a high band PLC Ethernet signal and a low band PLC Ethernet signal.

The second communication port unit connects with a subscriber location via at least one coaxial cable and splits a PLC Ethernet signal, which is transmitted from the subscriber location, into a high band PLC Ethernet signal and a low band PLC Ethernet signal.

The amplification unit amplifies the high band PLC Ethernet signal, which is split via the first communication port unit, and transmits the amplified high band PLC Ethernet signal to the subscriber location via the second communication port unit.

The low pass filter unit controls the low band PLC signal, which is split via the first communication port unit or the second communication port unit, to be transmitted to the optical network unit or the subscriber location. Specifically, the low pass filter unit may filter a low pass signal, which is split via the first communication port unit, at a predetermined frequency band and control the filtered low pass signal to be transmitted to the subscriber location. Also, the low pass filter unit may filter a low pass signal, which is split via the second communication port unit, at a predetermined frequency band and control the filtered low pass signal to be transmitted to the optical network unit. Therefore, the low pass filter unit may include a low pass filter which filters the low pass signal at a predetermined frequency band.

As described above, when a PLC optical network unit performs a PLC signal conversion, a trunk bridge amplifier may bypass a CATV signal, which is received from the PLC optical network unit, and transmit the CATV signal to a subscriber location via a downlink module.

Figure 6:
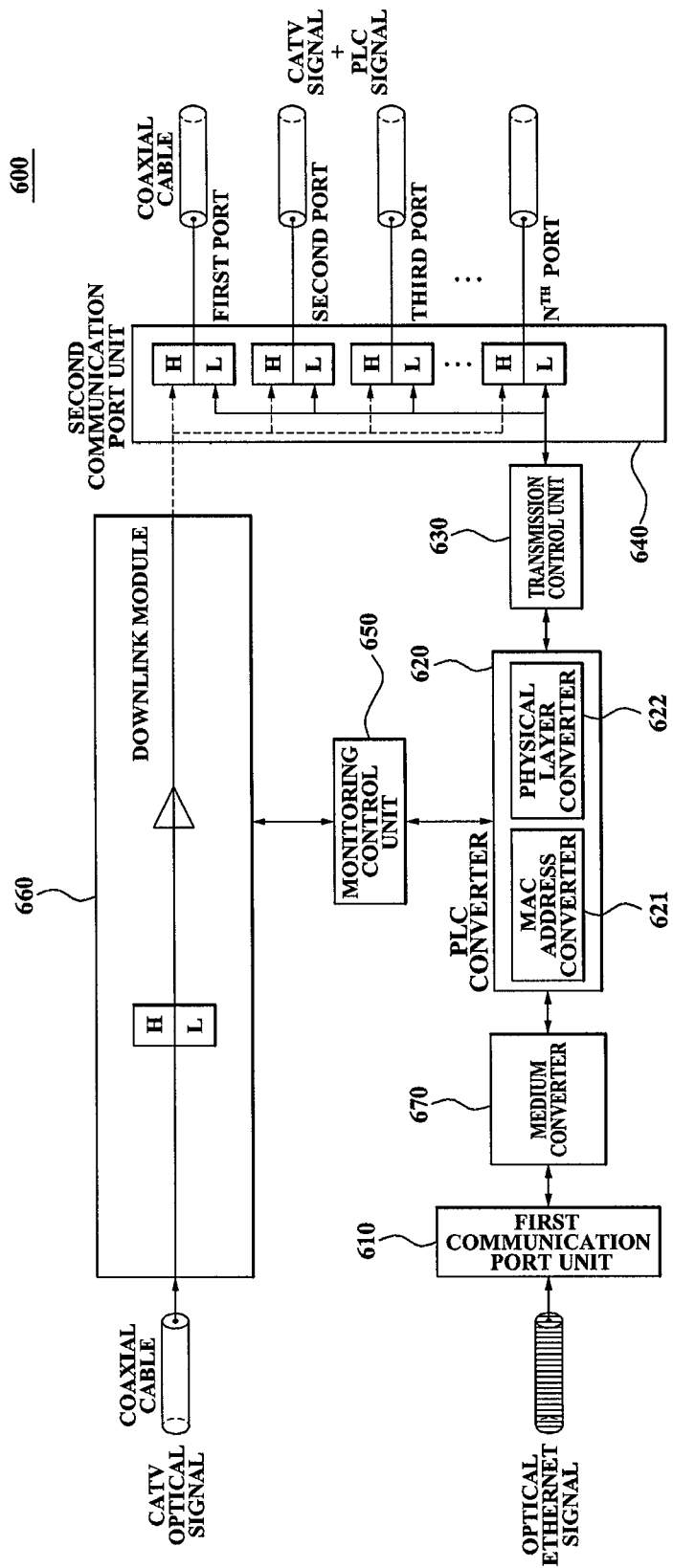
FIG. 6 is a block diagram illustrating a configuration of a PLC distribution amplifier according to an embodiment of the present invention.

FIG. 6 is a block diagram illustrating a configuration of a PLC distribution amplifier 600 according to an embodiment of the present invention.

The PLC distribution amplifier 600 according to the present embodiment includes a first communication port unit 610, a PLC converter 620, a transmission control unit 630, a second communication port unit 640, a monitoring control unit 650, and a medium converter 670. The PLC distribution amplifier 600 may further include a downlink module 660. The PLC converter 620 includes a MAC address converter 621 and a physical layer converter 622.

The PLC converter 620, the transmission control unit 630, the monitoring control unit 650, and the medium converter 670, as shown in FIG. 6, may replace an uplink module of an existing distribution amplifier. Specifically, the existing distribution amplifier generally includes a downlink module and the uplink module. The PLC distribution amplifier according to the present embodiment may replace the uplink module with the PLC converter 620, the transmission control unit 630, and the monitoring control unit 650. In this instance, the configuration and operation may be the same as the configuration of the optical network unit 300 as described above.

The first communication port unit 610 connects with an optical network unit or a trunk bridge amplifier via an optical fiber, and receives a predetermined optical Ethernet signal from the optical network unit or the trunk bridge amplifier. Also, the first communication port unit 610 may directly connect with an optical Ethernet device via the optical fiber, and directly receive the optical Ethernet signal from the optical Ethernet device, not using the optical network unit or the trunk bridge amplifier.

The medium converter 670 receives the optical Ethernet signal via the first communication port unit 610, and converts the optical Ethernet signal into an Ethernet signal. Specifically, the medium converter 670 may perform an optical-electrical conversion with respect to the optical Ethernet signal and thereby convert the optical Ethernet signal into the Ethernet signal.

The PLC converter 620 converts the Ethernet signal into a PLC Ethernet signal corresponding to a predetermined PLC protocol. The PLC converter 620 may include the MAC address converter 621 and the physical layer converter 622. A configuration and an operation of the PLC converter 620 may be the same as the configuration and operation of the PLC converter 630 which is included in the PLC optical network unit 300 of FIG. 3. Therefore, detailed description related thereto will be omitted.

In this instance, the PLC converter 620 converts the Ethernet signal into a PLC Ethernet signal which is in a frequency band between 5 MHz and 42 MHz. Specifically, the PLC distribution amplifier 600 according to the present embodiment may readily replace the uplink module with the PLC converter 620, the transmission control unit 630, and the monitoring control unit 650 by converting the Ethernet signal into the PLC Ethernet signal in the frequency band between 5 MHz and 42 MHz. In this instance, the frequency band is similar to an upstream signal frequency band of the uplink module in the existing distribution amplifier.

The transmission control unit 630 transmits the PLC Ethernet signal to a PLC coupling device installed in a predetermined subscriber location via at least one coaxial cable. In this instance, the at least one coaxial cable connects with the second communication port unit 640. Also, the transmission control unit 630 may couple the PLC Ethernet signal, as an analog signal, with the coaxial cable, and transmit the coupled PLC Ethernet signal. In this case, the transmission control unit 630 may include the coupling filter 410 and the coupler 420 as shown in FIG. 4. Specifically, the transmission control unit 630 may be embodied in the same way as the configuration and operation of the transmission control unit 340 which is included in the PLC optical network unit 300 according to an embodiment of the present invention.

The second communication port unit 640 connects with at least one coaxial cable. The second communication port unit 640 may include at least one coaxial cable terminal to connect with the at least one coaxial cable. In this instance, the at least one coaxial cable connects with the PLC coupling device installed in a predetermined subscriber location. In this case, the transmission control unit 630 may couple the PLC Ethernet signal outputted from the PLC converter and transmit the coupled PLC Ethernet signal to the PLC coupling device via each coaxial cable terminal which is included in the second communication port unit 640.

Also, the PLC coupling device may couple the PLC Ethernet signal with a power line, and transmit the coupled PLC Ethernet signal to at least one communication terminal installed in the subscriber location via the power line.

The downlink module 660 may connect with an optical network unit or a trunk bridge amplifier via a coaxial cable. Also, the downlink module 660 receives a CATV signal from the optical network unit via the coaxial cable. Also, the downlink module 660 may filter or amplify the CATV signal at a predetermined band, and transmit the filtered or amplified CATV signal to a subscriber location. In this instance, the downlink module may include a high pass filter, a low pass filter, an amplifier, and the like.

The monitoring control unit 650 detects an amplification level or an attenuation level of the CATV signal of the downlink module 660 and controls the downlink module 660 to amplify the CATV signal. Also, the monitoring control unit 650 may control the amplification level or the attenuation level of the PLC Ethernet signal which is converted via the PLC converter 620. As described above, the PLC distribution amplifier 600 according to the present embodiment may prevent an attenuation of a downstream signal and a PLC Ethernet signal by detecting an attenuation level of the downstream signal and the PLC Ethernet signal, compensating for the detected amplification level or the attenuation level to be a predetermined value, and transmitting/receiving the compensated amplification level or the attenuation level.

According to another embodiment of the present invention, when an optical network unit or a trunk bridge amplifier performs a PLC signal conversion, a distribution amplifier may be constructed to perform only an amplification of a downlink high pass signal or perform only a bypass operation of a downlink low pass signal, without performing the PLC signal conversion as the above-described PLC distribution amplifier 600.

In this case, an uplink module of the distribution amplifier may include a first communication port unit, a second communication port unit, an amplification unit and a low pass filter unit. A configuration of the distribution amplifier according to the present embodiment may be embodied in the same way as the configuration and operation of the above-described distribution amplifier. Therefore, detailed description related thereto will be omitted herein.

Figure 7:
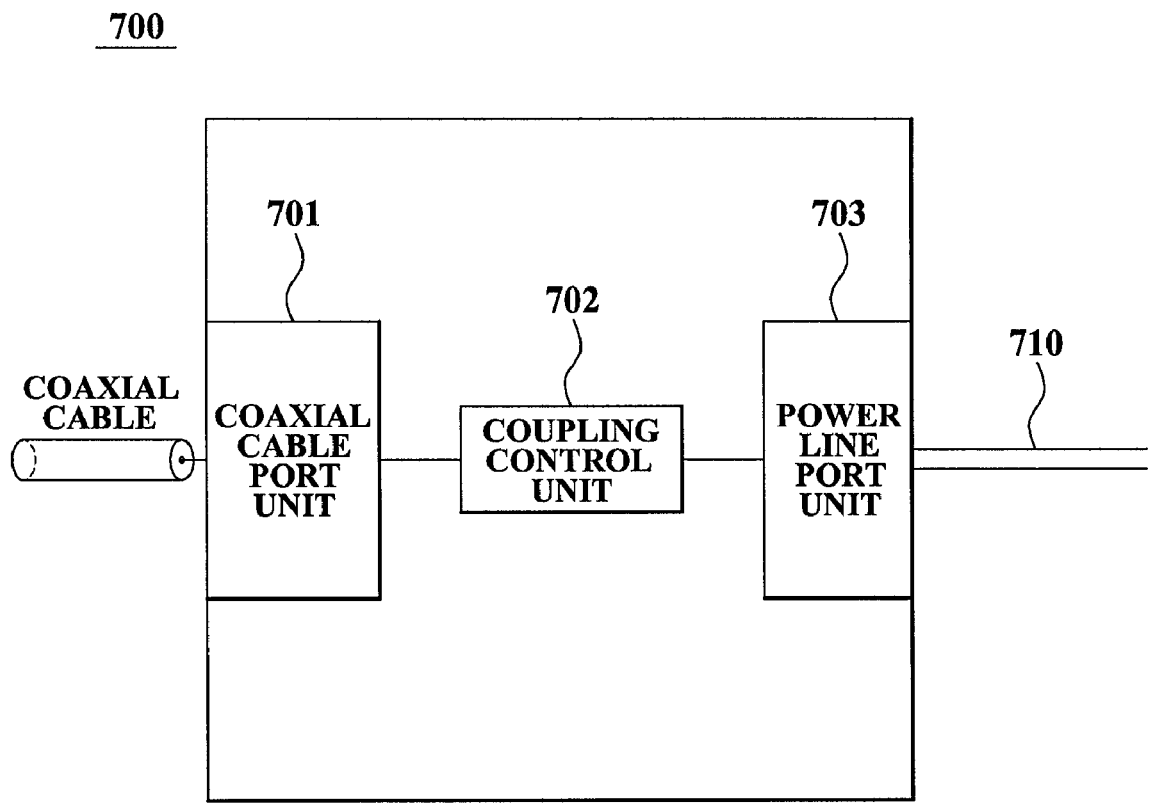
FIG. 7 is a block diagram illustrating a configuration of a PLC coupling device according to an embodiment of the present invention.

FIG. 7 is a block diagram illustrating a configuration of a PLC coupling device 700 according to an embodiment of the present invention.

The PLC coupling device 700 according to the present embodiment may include a coaxial cable port unit 701, a coupling control unit 702, and a power line port unit 703.

The coaxial cable port unit 701 connects with a trunk bridge amplifier or a distribution amplifier via a coaxial cable. The coaxial cable port unit 701 receives a PLC Ethernet signal from the trunk bridge amplifier or the distribution amplifier via the coaxial cable.

The power line port unit 703 connects with a PLC modem installed in at least one communication terminal, which is provided in a subscriber location, via a power line 710.

The coupling control unit 702 receives the PLC Ethernet signal via the coaxial cable port unit 701, couples the PLC Ethernet signal with the power line 710, and transmits the PLC Ethernet signal to the PLC modem installed in the at least one communication terminal. The coupling control unit 702 may include any of power line coupling control operations of a data signal which are performed by a general PLC modem. Also, the coupling control unit 702 may perform impedance matching with respect to the received PLC Ethernet signal, in correspondence to a frequency band of the power line 710.

Figure 8:
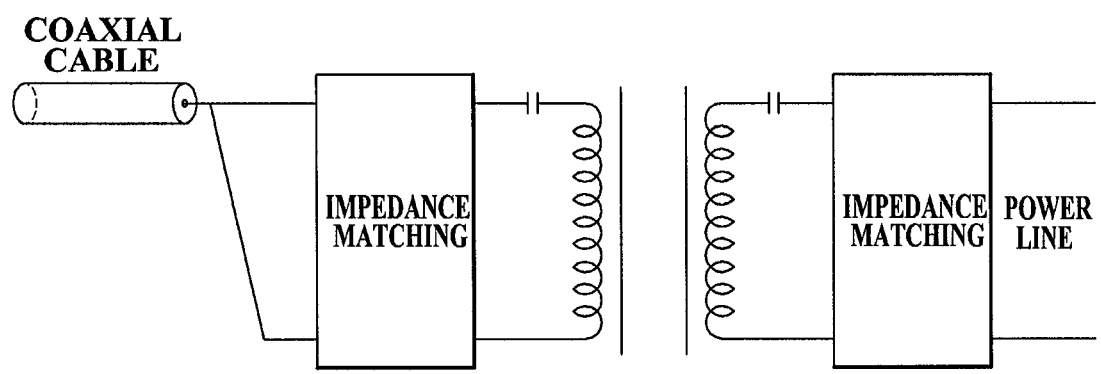
FIG. 8 is a diagram illustrating a circuit of a PLC coupling device according to an embodiment of the present invention.

Specifically, the PLC coupling device 700 receives a PLC Ethernet signal via a coaxial cable, couples the PLC Ethernet signal with a power signal of the power line 710, and transmits the coupled PLC Ethernet signal to each PLC modem. Therefore, as shown in FIG. 8, the PLC coupling device 700 may be embodied as a simple circuit including a predetermined impedance matching circuit, a coil, and a condenser.

As described above, the PLC Ethernet signal coupled with the power line 710 by the PLC coupling device 700 is transmitted to each PLC modem which connects with at least one communication terminal installed in a subscriber location. In this instance, the PLC modem extracts the PLC Ethernet signal from the coupled PLC Ethernet signal and the power signal transmitted from the power line 710, converts the extracted PLC Ethernet signal into a predetermined protocol, and transmits the converted PLC Ethernet signal to each communication terminal. The PLC modem may be utilized in a general PLC system. Also, the communication terminal may include a home automation device, a PC, a TV, a security system, and the like.

As described above, according to the present invention, an additional cable modem is not required in a subscriber location. Also, a PLC modem for converting the Ethernet signal into a PLC Ethernet signal is not required in the subscriber location. Therefore, a PLC system of the subscriber location may be even more easily constructed.

Also, when constructing a PLC system utilizing an HFC including a PLC optical network unit, a PLC trunk bridge amplifier, a PLC distribution amplifier, or a PLC coupling device according to the present invention, communication terminals of subscribers may be connected to each other. Also, the PLC system may be constructed to readily interoperate with a previously installed PLC network without additional equipment.

According to the present invention, there is provided a PLC optical network unit which does not require a PLC protocol conversion of an Ethernet signal by a cable modem and a PLC modem in each subscriber location, and enables a PLC communication between the each subscriber location and a communication terminal utilizing a PLC Ethernet signal as is, by receiving an optical signal from an optical transmitter via an optical fiber, converting the optical signal into the PLC Ethernet signal corresponding to a predetermined PLC protocol, and transmitting the PLC Ethernet signal to at least one subscriber location via a coaxial cable.

Also, according to the present invention, there is provided a PLC trunk bridge amplifier which does not require a PLC protocol conversion of an Ethernet signal by a cable modem and a PLC modem in each subscriber location, and enables a PLC communication between each subscriber location and a communication terminal utilizing a PLC Ethernet signal as is, by receiving an Ethernet signal from a predetermined optical network unit via a coaxial cable, converting the Ethernet signal into the PLC Ethernet signal corresponding to a predetermined PLC protocol, and transmitting the PLC Ethernet signal to at least one subscriber location via the coaxial cable.

Also, according to the present invention, there is provided a PLC distribution amplifier which does not require a PLC protocol conversion of an Ethernet signal by a cable modem and a PLC modem in each subscriber location, and enables a PLC communication between each subscriber location and a communication terminal utilizing a PLC Ethernet signal as is, by receiving an Ethernet signal from a predetermined optical network unit or a trunk bridge amplifier via a coaxial cable, converting the Ethernet signal into the PLC Ethernet signal corresponding to a predetermined PLC protocol, and transmitting the PLC Ethernet signal to at least one subscriber location via the coaxial cable.

Also, according to the present invention, there is provided a PLC coupling device which can embody a PLC system utilizing an existing coaxial cable and a power line, without a protocol conversion of an Ethernet signal and an additional power supply, by receiving a PLC Ethernet signal from the PLC optical network unit, the PLC trunk bridge amplifier, or the PLC distribution amplifier via a coaxial cable that connects with a subscriber location, coupling the PLC Ethernet signal with a power line, and transmitting the PLC Ethernet signal to at least one communication terminal installed in the subscriber location.

Also, according to the present invention, there is provided a PLC system utilizing an HFC which can optimally prevent an attenuation of a downstream signal and a PLC Ethernet signal by detecting an amplification level or an attenuation level of the downstream signal and the PLC Ethernet signal of the PLC optical network unit, the PLC trunk bridge amplifier or the PLC distribution amplifier, and compensating for the detected amplification level or the attenuation level to be a predetermined value, and transmitting the compensated amplification level or the attenuation level.

Also, according to the present invention, there is provided a PLC system utilizing an HFC which can more readily support an interoperation between a PLC network installed in a subscriber location and an external communication network without a PLC protocol conversion, by installing a PLC coupling device that performs only a medium conversion between a coaxial cable and a power line with respect to a PLC Ethernet signal in the subscriber location.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A power line communication (PLC) optical network unit of a hybrid fiber coaxial (HFC) communication system, the PLC optical network unit comprising:
   a first communication port unit connecting with a predetermined optical fiber, and receiving a predetermined optical Ethernet signal from a predetermined optical Ethernet device via the optical fiber;
   a second communication port unit connecting with at least one coaxial cable;
   a medium converter converting the received optical Ethernet signal into an Ethernet signal;
   a PLC converter converting the Ethernet signal into a PLC Ethernet signal corresponding to a predetermined PLC protocol; and
   a transmission control unit controlling the PLC Ethernet signal to be transmitted to a subscriber location via the at least one coaxial cable that connects with the second communication port unit, wherein the PLC converter comprises:
- a Media Access Control (MAC) address converter converting a MAC address of the Ethernet signal into a MAC address corresponding to the PLC protocol; and
- a physical layer converter modulating the Ethernet signal into a PLC Ethernet signal that has a physical layer corresponding to the PLC protocol, the Ethernet signal including the converted MAC address.

2. The PLC optical network unit of claim 1, wherein the PLC converter converts the Ethernet signal into the PLC Ethernet signal which is in a frequency band between 5 MHz and 42 MHz, or in a frequency band between 5 MHz and 85 MHz.

3. The PLC optical network unit of claim 1, wherein:
- the transmission control unit couples at least one PLC Ethernet signal, which is received via the second communication port unit, to be a single PLC Ethernet signal,
- the PLC converter converts the PLC Ethernet signal into an Ethernet signal, and
- the medium converter converts the Ethernet signal into an optical Ethernet signal and transmits the optical Ethernet signal to an optical transmitter via the first communication port unit and the optical fiber.

4. The PLC optical network unit of claim 1, further comprising:
- a downlink module converting a cable television (CATV) optical signal, which is received from a predetermined optical transmitter via the first communication port unit, into a CATV signal, amplifying or equalizing the CATV signal, and controlling the converted CATV signal to be transmitted to the subscriber location via the coaxial cable that connects with the second communication port unit; and
- a monitoring control unit controlling the amplification of the CATV signal of the downlink module by detecting an amplification level or an attenuation level of the CATV signal,
wherein the monitoring control unit controls the amplification level or the attenuation level of the PLC Ethernet signal which is converted via the PLC converter, and the CATV signal is in a frequency band between 54 MHz and 870 MHz or in a frequency band between 100 MHz and 870 MHz.

5. A PLC system using a hybrid fiber coaxial (HFC) comprising:
- an optical Ethernet device converting a first Ethernet signal, which is received from a predetermined IP network, into an optical Ethernet signal;
- an optical transmitter converting a CATV signal, which is received from a predetermined CATV system, into a CATV optical signal;
- an optical network unit converting the CATV optical signal, which is received from the optical transmitter via an optical fiber, into a CATV signal and converting the optical Ethernet signal, which is received from the optical Ethernet device, into a PLC Ethernet signal corresponding to a predetermined PLC protocol; and
- a PLC coupling device receiving the CATV signal or the PLC Ethernet signal from the optical network unit, and controlling the CATV signal to be transmitted to at least one display terminal which is installed in a subscriber location and controlling the PLC Ethernet signal to be transmitted to at least one communication terminal, which is installed in a subscriber location, via a power line, wherein the optical network unit comprises:
- a medium converter converting the received optical Ethernet signal into a second Ethernet signal;
- a Media Access Control (MAC) address converter converting a MAC address of the second Ethernet signal into a MAC address corresponding to the PLC protocol; and
- a physical layer converter modulating the second Ethernet signal into a PLC Ethernet signal that has a physical layer corresponding to the PLC protocol, the Ethernet signal including the converted MAC address.

* * * * *